United States Patent [19]

Brown

[11] Patent Number: 4,480,767
[45] Date of Patent: Nov. 6, 1984

[54] APPORTIONING AND DISPENSING APPARATUS

[75] Inventor: Amos J. Brown, Bothell, Wash.

[73] Assignee: Belshaw Bros., Inc., Seattle, Wash.

[21] Appl. No.: 353,784

[22] Filed: Mar. 1, 1982

[51] Int. Cl.³ ........................ A21C 11/18; G01F 11/02
[52] U.S. Cl. ..................................... 222/340; 222/377; 222/378; 425/288
[58] Field of Search ................ 425/288; 222/377, 378, 222/260, 453, 340

[56] References Cited

U.S. PATENT DOCUMENTS

| | | | |
|---|---|---|---|
| 1,738,033 | 10/1929 | Belshaw | |
| 2,191,284 | 2/1940 | Morris | 425/288 X |
| 2,507,254 | 5/1950 | Jones | 425/288 |
| 2,637,282 | 5/1953 | Belshaw | 107/14 |
| 2,828,700 | 4/1958 | Belshaw | 107/14 |
| 3,126,842 | 3/1964 | Belshaw | 107/14 |
| 3,154,027 | 10/1964 | Belshaw | 107/14 |

Primary Examiner—Stanley H. Tollberg
Assistant Examiner—Frederick R. Handren
Attorney, Agent, or Firm—Hubbard, Thurman, Turner & Tucker

[57] ABSTRACT

In an apparatus to apportion and dispense dough, wherein dough is discharged through an outlet having a lower, circumferential cutting edge and is cut off by a piston having an upper, circumferential cutting edge, the piston has an upper, integral, coaxial boss, which has a convex, frusto-conical surface extending upwardly and being spaced from the cutting edge of the piston. Also, an annulus providing the outlet has a concave, frusto-conical surface, which flares upwardly.

2 Claims, 4 Drawing Figures

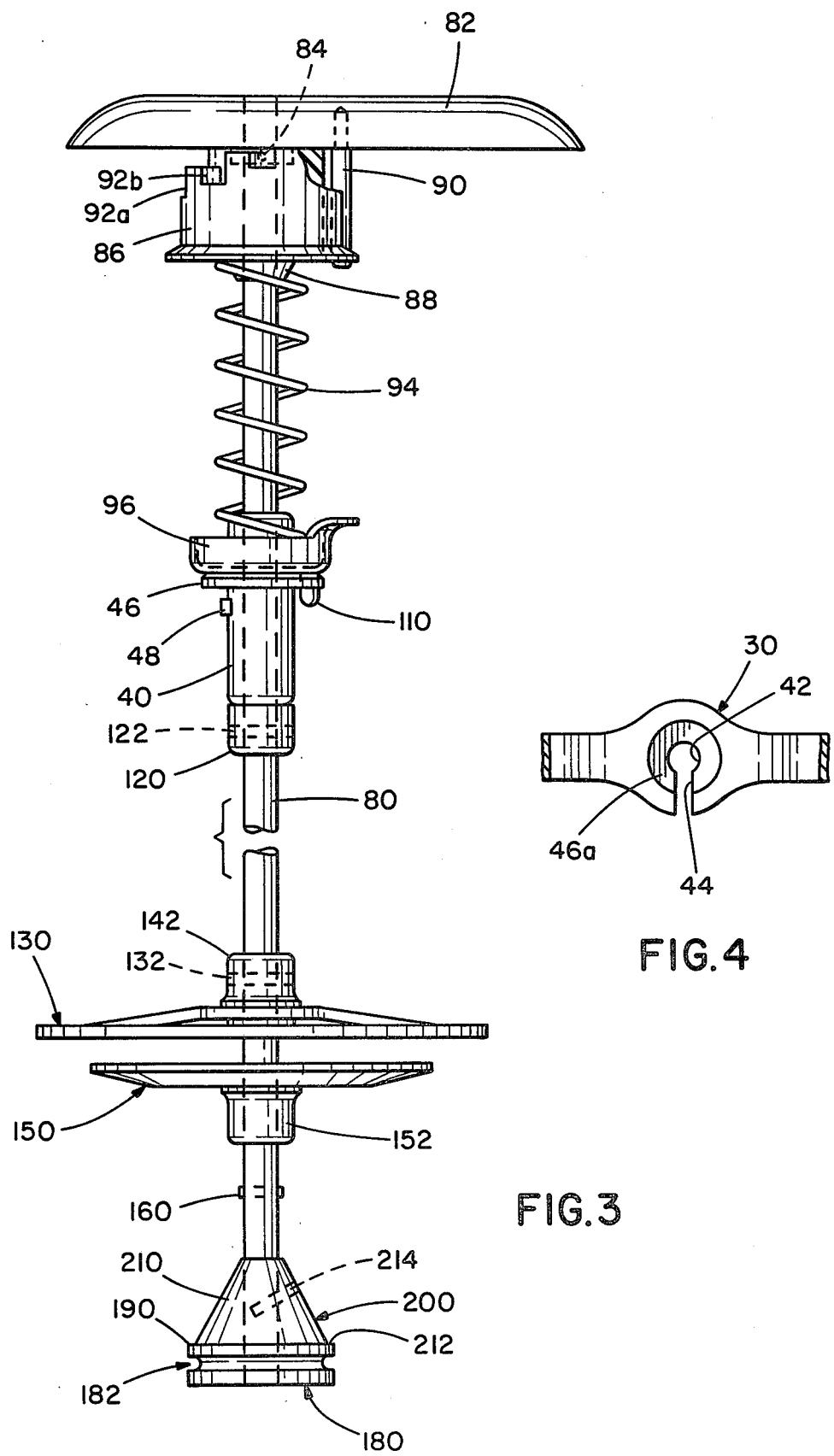

APPORTIONING AND DISPENSING APPARATUS

BACKGROUND OF THE INVENTION

This invention pertains to an improvement in an apparatus of a type used to apportion and dispense dough, as exemplified in U.S. Pat. No. 2,637,282, U.S. Pat. No. 2,828,700, U.S. Pat. No. 3,126,842, and U.S. Pat. No. 3,154,027.

Generally, as disclosed in these several patents, the apparatus comprises a hopper, which has a bowl adapted to hold dough, and which has a lower outlet having a lower, circumferential cutting edge, a cylindrical piston, which is shaped so as to fit closely into the outlet, which is associated operatively with the outlet for axial movement of the piston between an upper position wherein the piston plugs the outlet and a lower position wherein the piston is spaced below the outlet, and which has an upper surface having an upper, circumferential cutting edge, means to reciprocate the piston between the upper and lower positions, and means to dispense dough from the hopper. In the apparatus, dough thus dispensed is cut off, by the cutting edges, as the piston moves from the lower position to the upper position.

As exemplified in U.S. Pat. No. 2,637,282 and U.S. Pat. No. 2,828,700, the apparatus comprises a hopper, which has a bowl adapted to hold dough, and which has a throat opening downwardly from the bowl and having an upper portion and a lower portion, an annulus, which is mounted coaxially and integrally in the lower portion of the throat, and which has a cylindrical outlet opening from the bowl and having a lower, circumferential cutting edge, a rod, which is reciprocatable coaxially in the hopper between an upper position and a lower position, which has a lower portion extending through the outlet, and which has a lower end extending downwardly past the cutting edge of the outlet when the rod is positioned in the lower position, and means to move the rod downwardly and upwardly so as to reciprocate the rod between the upper As disclosed in U.S. Pat. No. 2,637,282 and U.S. Pat. No. 2,828,700, the rod is moved downwardly by a handle, which is pressed manually by a user, and the rod is moved upwardly by a spring coil, which biases the rod upwardly. Alternatively, it is known for the rod to be moved downwardly and upwardly by a crank, which is driven by a motor.

As exemplified in U.S. Pat. No. 2,637,282 and U.S. Pat. No. 2,878,700, the apparatus also comprises a valve stop, which is mounted integrally to the lower portion of the rod so as to extend radially from the rod, and so as to be spaced from the lower end of the rod, a valve plate, which is mounted coaxially and integrally to the lower portion of the rod, above and in spaced relation to the stop, so as to reciprocate within the lower portion of the throat, and which has an aperture enabling batter from the bowl to flow downwardly through the plate, and which is shaped so as to close the throat except for the aperture, and a valve disc, which is mounted coaxially and slidably on the rod, between the plate and the stop, and which is shaped so as to block the aperture when the disc is positioned against the plate. Also, the apparatus comprises a cylindrical piston, which is slidable axially in the outlet, which is mounted integrally and coaxially to the lower end of the rod so as to be drawn upwardly into the outlet when the rod is moved to the upper position, and so as to be spaced below the outlet when the rod is positioned in the lower position, which is shaped so as to plug the outlet when the rod is positioned in the upper position, and which has an upper, annular surface having an upper, circumferential cutting edge.

In the apparatus, dough enters the throat from the bowl through the aperture in the plate and is drawn around and beneath the disc as the rod is moved upwardly from the lower position to the upper position, whereby dough is dispensed from the throat through the outlet as the rod is moved downwardly from the upper position to the lower position, and whereby dough discharged through the outlet is severed by the cutting edges as the rod is moved upwardly from the lower position to the upper position so as to draw the piston upwardly into the outlet.

In the apparatus disclosed in each of these several patents, a dough for doughnuts is apportioned and dispensed. However, as disclosed in these several patents, the apparatus cannot be used satisfactorily to apportion and dispense batter containing raisins, shredded coconut, nut meats, frozen berries, or large particulates of other types, as such particulates in batter tend to accumulate in the apparatus, particularly on the annulus and the piston.

Also, raisins which may have been presoaked or frozen berries tend to be crushed by the apparatus, particularly between the piston and the outlet, whereby muffins or other products made from batter containing crushed raisins or crushed berries tend to be discolored. Also, batter of a thin consistency tends to splatter as it flows onto the piston. However, because it is more plastic, dough does not tend to splatter.

Herein, "batter" refers to a semiliquid mixture to be baked, as for muffins, and "dough" refers to a kneadable mass to be baked, as for doughnuts. However, in some contents, these terms may be used synonymously.

SUMMARY OF THE INVENTION

Generally, the improvement of this invention contemplates that the piston has an upper, integral, coaxial boss, which has a convex, frusto-conical surface extending upwardly and being spaced from the upper, circumferential cutting edge of the piston. Thus, the apparatus can be used to dispense batter as well as dough. Thus, batter being dispensed tends to flow downwardly along the convex, frusto-conical surface of the boss so as not to splatter even if thin, and so as not to accumulate on the piston even if mixed with raisins, shredded coconut, nut meats, frozen berries, or large particulates of other types. Also, such particulates, if caught between the piston and the outlet, tend not to be crushed but to be deflected by the convex, frusto-conical surface of the piston or cut cleanly, by the cutting edges, as the piston moves upwardly.

Advantageously, the improvement of this invention may be incorporated in the apparatus exemplified in U.S. Pat. No. 2,637,282 and U.S. Pat. No. 2,828,700, as discussed above, whereupon the improvement of this invention contemplates that the annulus may have a concave, frusto-conical surface, which flares upwardly. Thus, batter tends to flow downwardly along the frusto-conical surface of the annulus so as not to accumulate on such surface even if mixed with raisins, shredded coconut, nut meats, frozen berries, or large particulates of other types.

Additionally, a manual means may be used to move the piston downwardly and a spring means may be used to move the piston upwardly, via the rod if used.

A use of an apparatus embodying the improvement of this invention to particular advantage is to dispense batter for muffins containing raisins, shredded coconut, nut meats, frozen berries, or large particulates of other types.

BRIEF DESCRIPTION OF THE DRAWINGS

In FIG. 2, an exemplary part of a baking pan also is shown, in phantom lines.

FIG. 3 is an enlarged, assembly view of a handle, a rod, a piston, a spring coil, and associated components, as shown in FIG. 2 but removed from the apparatus. In FIG. 3, other components have been omitted.

In FIG. 2, as compared to FIG. 3, the handle, the rod, and the piston are shown to have been depressed to a lower position, wherein the spring coil has been compressed. Also, some parts are shown to have been rotated by one quarter-turn.

FIG. 4 is a fragmentary sectional view of certain features of a bail, as taken along line 4—4 of FIG. 2 in a direction indicated by arrows. In FIG. 4, other components have been omitted.

DETAILED DESCRIPTION OF PREFERRED EMBODIMENT

Figure 1:
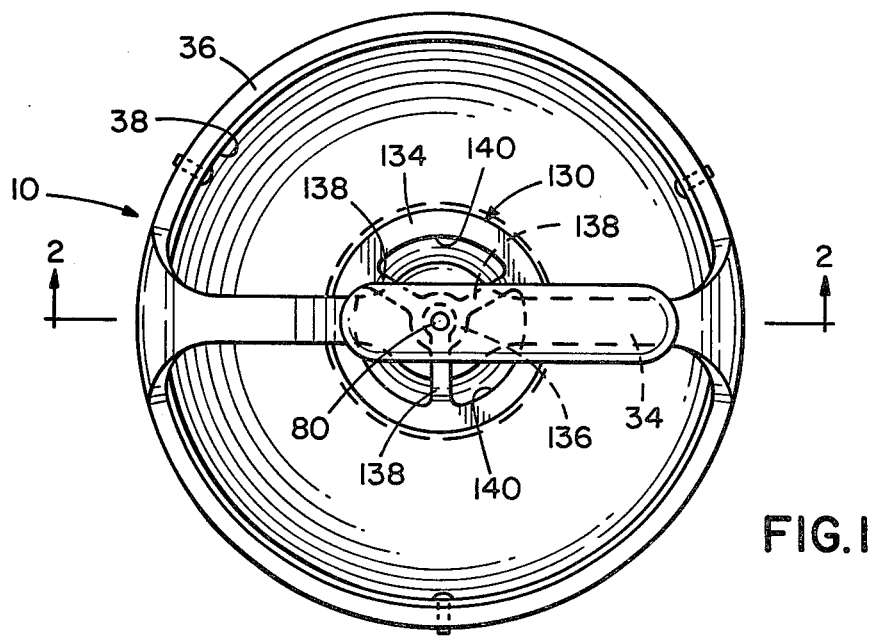
FIG. 1 is a top, plan view of an apparatus constituting a preferred embodiment of this invention.

In the drawings, an apparatus 10, which is designed to dispense batter or dough into a baking pan 12 having a baking cup 14 or into another suitable receptacle, is shown. Batter to be dispensed by the apparatus 10 may be thick or thin in consistency and may contain raisins, shredded coconut, nut meats, frozen berries, or large particulates of other types, as used in batter for muffins, pancakes, or other products made from batter.

The apparatus 10 comprises a hopper 20, which has a bowl 22 adapted to hold batter or dough to be dispensed in measured quantities, each quantity to be dispensed into a baking cup like the baking cup 14 of the baking pan 12. The hopper 20 has a lower, tubular throat 24, which opens downwardly from the bowl 22. A bail 30, which has opposite arms 32, 34, is mounted over the bowl 22 by a ring 36, which is formed integrally with the arms 32, 34, and which is riveted to an upper margin 38 of the bowl 22. A polymeric sleeve 40, which serves as a bearing means for a purpose described below, is fitted through a central aperture 42, which is formed in a central portion of the bail 30 between the arms 32, 34, and which includes a radial notch 44, as shown in FIG. 4. The sleeve 40 has an annular flange 46, which rests on an upper margin 46a of the aperture 42, and a radial nub 48, which extends beneath a lower margin 46b of the aperture 42 so as to secure the polymeric sleeve 40. The nub 48 fits through the notch 44 when the sleeve 40 is assembled to the bail 30. In final assembly, the nub 48 is diametrically opposite to the notch 44.

The apparatus 10 comprises an annulus 50, which is mounted coaxially and integrally in a lower portion of the throat 24. The annulus 50 has a circumferential groove 52, into which a circumferential bead 54 of the throat is deformed, as by rolling, so as to secure the annulus 50. A tubular insert 56, which is mounted in a central recess 58 of the annulus 50, defines a cylindrical outlet 60 for batter or dough from the bowl 22. The cylindrical outlet 60 has a lower, circumferential cutting edge 70, which is square-edged in axial section. A pair of O-rings 64, 66, are seated in circumferential grooves in the annulus 50, between the annulus 50 and the thoat 24, so as to seal the throat 24 around the annulus 50.

The apparatus 10 comprises a rod 80, which passes through the sleeve 40, and which is reciprocatable coaxially in the hopper 20 between an upper postion and a lower position. A transverse handle 82 is mounted integrally to the upper end of the rod 80 by a cross-pin 84. An annular element 86, which has a lower annulus boss 88, is mounted slidably and rotatably on the rod 80 below the handle 82. A pin 90, which depends integrally from the handle 82, is placed into a selected one of plural recesses 92a, 92b, etc. formed in a peripheral portion of the annular member 86. A fragmentary part of the pin 90 is shown in FIG. 3, wherein a fragmentary part of the member 86 has been broken away. A spring coil 94 is piloted on the rod 80 between the element 86 and an annular cup 96, which is disposed around the rod 80, and which rests on the flange 46 of the sleeve 40, so as to bias the rod upwardly. A pin 110, which depends from the cup 96, passes through a radial slot 112 formed in the flange 46, into the radial notch 44, so as to prevent rotation of the sleeve 40 and the cup 96. The handle 82 is depressed manually so as to move the rod 80 downwardly. Either arm of the bail 30 may be grasped when the handle 82 is depressed. When the handle 82 has been released, the spring coil 94 moves the rod 80 upwardly. Thus, the rod 80 may be reciprocated between the upper and lower positions.

The upper position of the rod 80 is defined by a collar 120, which is mounted integrally on the rod 80 by a cross-pin 122, below the sleeve 40, so as to engage the sleeve 40 in the upper position of the rod 80. The lower position of the rod 80 is defined by the boss 88, which engages the sleeve 40 in the lower position of the rod 80. The recesses 92a, 92b, etc. receiving the pin 90, which is elongated sufficiently, have different axial depths so as to enable the lower position of the rod 80 to be adjusted. The upper and lower positions of the rod 80 determine what quantity of batter or dough is dispensed upon each reciprocation of the rod 80. A similar arrangement to reciprocate the rod and to enable the upper and lower positions to be adjusted is disclosed in U.S. Pat. No. 2,828,700.

A valve plate 130 is mounted coaxially and integrally to a lower portion of the rod 80, above the lower end of the rod 80. The plate 130 is secured to the rod 80 by a cross-pin 132. The plate 130 has an outer annulus 134, an inner annulus 136, and three radial arms 138, which define three enlarged apertures 140 in the plate 130. The cross-pin 132 passes through a collar 142, which is mounted integrally above and to the inner annulus 136, and through the rod 80. The apertures 140 enable batter or dough to be drawn downwardly through the plate 130, which is shaped so as to close the throat 24 except for the apertures 140.

Figure 2:
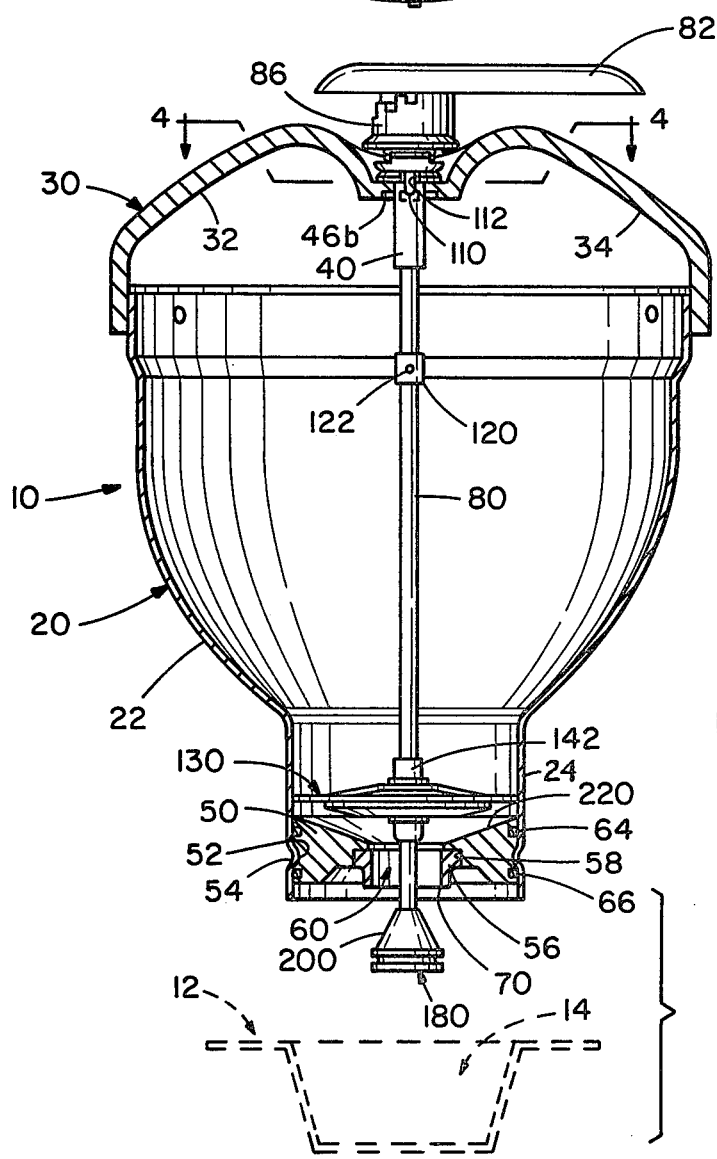
FIG. 2 is an axial, sectional view of the apparatus, as taken along line 2—2 of FIG. 1 in a direction indicated by arrows.

A valve disc 150, below and to which a collar 152 is mounted integrally, is mounted coaxially and slidably on the rod 80, between the valve plate 130 and a cross-pin 160, which is mounted integrally through the lower portion of the rod 80, below the valve plate 130, but above the lower end of the rod 80, and which extends radially from the rod 80 at opposite ends of the cross-pin 160 so as to serve as a valve stop limiting downward movement of the collar 152 and the disc 150 (in a relative sense) along the rod 80. The disc 150 is shaped so as to block the apertures 140 in the plate 130 when positioned against the plate 130, as shown in FIG. 2.

A cylindrical piston 180, which is slidable axially in the outlet 60, is mounted integrally and coaxially to the lower end of the rod 80 so as to be drawn upwardly into the outlet 60 when the rod 80 is moved to the upper position, as defined by the collar 120, and so as to be spaced below the outlet 60 when the rod 80 is positioned in the lower position. The piston 180 is shaped so as to plug the outlet 60 when the rod 80 is positioned in the upper position. The piston 180 has a circumferential groove 182, which may be configured so as to hold an O-ring (not shown, in accordance with U.S. Pat. No. 3,154,027) so as to seal the outlet 60 more effectively when the piston 180 plugs the outlet 60. If an O-ring is not seated in the groove 182, dough or batter accumulates in the groove so as to seal the outlet 60 less effectively but adequately for many applications. The piston 180 has an upper, circumferential cutting edge 190, which may be rounded slightly so as to accommodate minor axial misalignments of the piston 180 and the outlet 60 when the piston 180 is drawn upwardly into the outlet 60.

In the apparatus 10, dough or batter enters the throat 24 through the apertures 140 in the plate 130 and is drawn around and beneath the disc 150 as the rod 80 is moved upwardly from the lower position to the upper position. Once the piston 180 plugs the outlet 60, whereupon air cannot enter the outlet 60, a positive force is imparted on dough or batter in the hopper 20. Thus, dough or batter is apportioned and dispensed in a measured quantity from the throat 24 through the outlet 60 as the rod 80 is moved downwardly from the upper position to the lower position. The plate 130 and the disc 150, which blocks the apertures 140 in the plate 130 when the plate 130 is moved downwardly with the rod 80, extrude the measured quantity of dough or batter from the throat 24 through the outlet 60. Also, dough or batter discharged through the outlet 60 is severed by the cutting edges 70, 190, as the rod 80 is moved upwardly from the lower position to the upper position so as to draw the piston 180 upwardly into the outlet 60.

As described so far, the apparatus 10 is similar to the apparatus exemplified in the prior patents noted above. However, as explained above, the apparatus exemplified in those prior patents cannot be used satisfactorily to dispense batter containing raisins, shredded coconut, nut meats, frozen berries, or large particulates of other types, as such particulates in batter tend to accumulate in the apparatus, particularly on the annulus and the piston. Also, raisins, which may have been presoaked, or frozen berries tend to be crushed by the apparatus, particularly between the piston and the outlet. Also, batter of a thin consistency tends to splatter as it flows onto the piston. These shortcomings of the apparatus exemplified in the prior patents noted above have been overcome by the improvement of this invention.

In accordance with the improvement of this invention, the piston 180 has an upper, integral, coaxial boss 200, which has a convex, frusto-conical surface 210 extending upwardly and being spaced from the cutting edge 190 of the piston 180 by an annular margin 212. As shown in FIG. 3, the piston 180 and the boss 200 may be fabricated as a single piece, through which the rod 80 extends, and which is secured to the rod 80 by a flush pin 214. In accordance with the improvement of this invention, the annulus 50 has a concave, frusto-conical surface 220, which flares upwardly.

Accordingly, the apparatus 10 can be used to apportion and dispense not only dough but also batter, and dough or batter to be apportioned and dispensed by the apparatus 10 may contain raisins, shredded coconut, nut meats, frozen berries, or large particulates of other types, as may be used for muffins. Batter tends to flow along the frusto-conical surfaces 210, 220, so as not to splatter on the piston 180 even if thin, and so as not to accumulate on the annulus 50 or on the piston 180 even if mixed with such particulates. Also, such particulates tend not to be crushed by the apparatus 10. If caught between the piston 180 and the outlet 60, such particulates tend to be deflected by the convex, frusto-conical surface 210 of the piston 180 or to be cut cleanly, by the cutting edges 70, 190, as the piston 180 is drawn into the outlet 60.

Although one use of the apparatus 10 to particular advantage thus is to apportion and dispense batter for muffins containing such particulates, the apparatus 10 also may be used to apportion and dispense dough or batter of diverse types.

I claim:
1. In an apparatus of a type comprising
   (a) a hopper, which has a bowl adapted to hold dough, and which has a throat opening downwardly from the bowl and having an upper portion and a lower portion,
   (b) an annulus, which is mounted coaxially and integrally in the lower portion of the throat, and which has a cylindrical outlet opening from the bowl and having a lower, circumferential cutting edge,
   (c) a rod which is reciprocatable coaxially in the hopper between an upper position and a lower position, which has a lower portion extending through the outlet, and which has a lower end extending downwardly past the cutting edge of the outlet when the rod is positioned in the lower position but not past the cutting edge of the outlet when the rod is positioned in the upper position,
   (d) means to move the rod downwardly and upwardly so as to reciprocate the rod between the upper and lower positions,
   (e) a valve stop, which is mounted integrally to the lower portion of the rod so as to extend radially from the rod, and so as to be spaced from the lower end of the rod,
   (f) a valve plate, which is mounted coaxially and integrally to the lower portion of the rod, above and in spaced relation to the stop, so as to reciprocate within the upper portion of the throat, which has an aperture enabling dough from the bowl to flow downwardly through the plate, and which is shaped so as to close the throat except for the aperture,
   (g) a valve disc, which is mounted coaxially and slidably on the lower portion of the rod, between the plate and the stop, and which is shaped so as to block the aperture when the disc is positioned against the plate, and
   (b) a cylindrical piston, which is slidable axially in the outlet, which is mounted integrally and coaxially to the lower end of the rod so as to be drawn upwardly into the outlet when the rod is moved to the upper position, and so as to be spaced below the outlet when the rod is positioned in the lower posi- tion, which is shaped so as to plug the outlet when the rod is positioned in the upper position, and which has an upper, circumferential cutting edge, whereby dough enters the throat from the bowl through the aperture in the plate and flows around and beneath the disc as the rod is impelled upwardly from the lower position to the upper position, whereby dough is dispensed from the throat through the outlet as the rod is moved downwardly from the upper position to the lower position, and whereby dough dispensed through the outlet is cut off, by the cutting edges, as the rod is moved upwardly from the lower position to the upper position so as to draw the piston upwardly into the outlet, an improvement wherein the piston has an upper, integral, coaxial boss, which has a convex, frusto-conical surface extending upwardly and being spaced from the upper, circumferential cutting edge of the piston, and wherein the annulus has a concave, frusto-conical surface, which flares upwardly, whereby the apparatus can be used to dispense batter as well as dough, whereby batter tends to flow downwardly along the frusto-conical surfaces so as not to splatter on the piston even if thin, and so as not to accumulate on the annulus or on the piston even if mixed with raisins, shredded coconut, nut meats, frozen berries, or large particulates of other types, and whereby such particulates, if caught between the piston and the outlet, tend not to be crushed but to be deflected by the convex, frusto-conical surface of the piston or cut cleanly, by the cutting edges, as the piston is drawn into the outlet.

2. The improvement of claim 1 wherein the means to move the rod comprises a manual means to move the rod downwardly and a spring means to move the rod upwardly.

* * * * *